(12) United States Patent
Nishida et al.

(10) Patent No.: US 7,756,112 B2
(45) Date of Patent: Jul. 13, 2010

(54) IP TELEPHONE SYSTEM, IP TELEPHONE APPARATUS AND METHOD FOR RECORDING MESSAGE

(75) Inventors: Toshiko Nishida, Kanagawa (JP); Kiyoshi Toyoda, Tokyo (JP)

(73) Assignee: Panasonic Corporation, Osaka (JP)

( * ) Notice: Subject to any disclaimer, the term of this patent is extended or adjusted under 35 U.S.C. 154(b) by 1120 days.

(21) Appl. No.: 11/183,962

(22) Filed: Jul. 19, 2005

(65) Prior Publication Data

US 2006/0029042 A1 Feb. 9, 2006

(30) Foreign Application Priority Data

Aug. 4, 2004 (JP) ............ P2004-228585

(51) Int. Cl.
*H04L 12/66* (2006.01)
*H04M 3/50* (2006.01)
*H04M 3/527* (2006.01)

(52) U.S. Cl. ............... 370/352; 379/88.22; 379/88.25

(58) Field of Classification Search ......... 379/88.25, 379/88.22; 370/352–356
See application file for complete search history.

(56) References Cited

U.S. PATENT DOCUMENTS

| | | | | |
|---|---|---|---|---|
| 5,422,936 | A * | 6/1995 | Atwell | 379/88.23 |
| 5,625,675 | A * | 4/1997 | Katsumaru et al. | 379/88.25 |
| 6,751,299 | B1 * | 6/2004 | Brown et al. | 379/88.18 |
| 7,072,459 | B2 | 7/2006 | Murai | |
| 7,161,933 | B2 * | 1/2007 | Stanford | 370/352 |
| 2002/0051520 | A1 | 5/2002 | Yamade et al. | |
| 2003/0048892 | A1 | 3/2003 | Murai | |
| 2003/0074461 | A1 * | 4/2003 | Kang et al. | 709/230 |
| 2004/0028027 | A1 | 2/2004 | McClung et al. | |

FOREIGN PATENT DOCUMENTS

| | | |
|---|---|---|
| CA | 2304838 | 10/2000 |
| EP | 1022883 A | 7/2000 |
| JP | 9-252348 | 9/1997 |

(Continued)

OTHER PUBLICATIONS

English language Abstract of JP 2003-188992.

(Continued)

*Primary Examiner*—Ahmad F Matar
*Assistant Examiner*—Jirapon Intavong
(74) *Attorney, Agent, or Firm*—Greenblum & Bernstein, P.L.C.

(57) ABSTRACT

An IP telephone system includes a source IP telephone apparatus, a destination telephone apparatus, a Web server and an ENUM server. The IP telephone apparatuses are connected to an IP network. The Web server stores control information for controlling an answering machine function. The control information corresponds to a telephone number assigned to the source or destination IP telephone apparatus. The ENUM server stores a NAPTR resource record in which a URI specifies link information related to the control information stored in the Web server. In the IP telephone system, the IP telephone apparatus that has received a call transmits, to the ENUM server, a query for a NAPTR record corresponding to an intended recipient's telephone number. The IP telephone apparatus then transmits, to the Web server, a request for the control information corresponding to the URI included in the obtained NAPTR resource record, and controls the answering machine function according to the obtained control information.

17 Claims, 16 Drawing Sheets

FOREIGN PATENT DOCUMENTS

| | | |
|---|---|---|
| JP | 10-75294 | 3/1998 |
| JP | 10-171733 | 6/1998 |
| JP | 2000-299734 | 10/2000 |
| JP | 2002-101207 | 4/2002 |
| JP | 2003-87835 | 3/2003 |
| JP | 2003-125099 | 4/2003 |
| JP | 2003-188992 | 7/2003 |
| JP | 2004-147195 | 5/2004 |

OTHER PUBLICATIONS

ENUM Trial Japan, "ENUM Trial Japan First Report," May 2004, together with a partial English translation of the same.

U.S. Appl. No. 11/183,966 to Toshiko Nishida et al., filed Jul. 19, 2005.

U.S. Appl. No. 11/183,982 to Toshiko Nishida et al., filed Jul. 19, 2005.

U.S. Appl. No. 11/183,977 to Toshiko Nishida et al., filed Jul. 19, 2005.

U.S. Appl. No. 11/183,868 to Toshiko Nishida, filed Jul. 26, 2005.

Faltstrom, "E.164 number and DNS", rfc2916.txt, IETF Standard, Internet Engineering Task Force, Sep. 1, 2000, XP015008699.

Huston, "Implications of ENUM", Internet Citation, [online] Sep. 30, 2002, XP002363539, Retrieved from the Internet: URL:http://www.cisl.ucar.edu/nets/projects/Westnet/prev-mtg/200307.meeting/2003.presentations/enum.ppt [retrieved on Jan. 18, 2006].

Yoshirou Yoneya, Nikkei Byte saishin Network Gijyutu Taikei, Nikkei Network, Nikkei Business Publications, Inc., Feb. 22, 2004, No. 47, pp. 116-120, together with an English language translation.

Chimura, Saishin Network Gijyutsu Taikei No. 8 IP Telephone (Kouhen), Nikkei Byte No. 231, Japan, Nikkei Business Publication, Inc., Jul. 22, 2002, pp. 104-109.

English language Abstract and partial English translation of JP 2002-101207, Apr. 5, 2002.

English language Abstract of JP 9-252348, Sep. 22, 1997.

English language Abstract and partial English translation of JP 2004-147195, May 20, 2004.

English language Abstract of JP 10-75294, Mar. 17, 1998.

English language Abstract of JP 2000-299734, Oct. 24, 2000.

English language Abstract of JP 2003-87835, Mar. 20, 2003.

English language Abstract of JP 2003-125099, Apr. 25, 2003.

English language Abstract of JP 10-171733, Jun. 26, 1998.

\* cited by examiner

Fig.3

| Telephone number | URI |
|---|---|
| 05012341111 | taro@tokyo.sip.jp |
| 05012342222 | hanako@tokyo.sip.jp |

Fig.6

| Enum domain name | | Order | Preference | Flags | Service | URI scheme | |
|---|---|---|---|---|---|---|---|
| | | | | | | | URI |
| 1.1.1.1.4.3.2.1.0.5.1.8.e164.arpa | IN NAPTR | 100 | 10 | "u" | "E2U+sip" | "!^.*$!sip:" | taro@tokyo.sip.jp" |
| | IN NAPTR | 100 | 10 | "u" | "E2U+http" | "!^.*$!http:" | //www.tokyo.sip.com/user taro.html" |
| 2.2.2.2.4.3.2.1.0.5.1.8.e164.arpa | IN NAPTR | 100 | 10 | "u" | "E2U+sip" | "!^.*$!sip:" | hanako@tokyo.sip.jp" |
| | IN NAPTR | 100 | 10 | "u" | "E2U+http" | "!^.*$!http:" | //www.tokyo.sip.com/user hanako.html" |

NAPTR resource record

Fig.7

| URI | IP address |
| --- | --- |
| taro@tokyo.sip.jp | 192.168.1.1 |
| hanako@tokyo.sip.jp | 192.168.1.2 |
| jiro@tokyo.sip.jp | 192.168.1.3 |
| yoshiko@tokyo.sip.jp | 192.168.1.4 |

Fig.8

| URL(URI) | Telephone number | User name | Recording | E-mail forwarding | Forwarding e-mail address |
|---|---|---|---|---|---|
| http://www.tokyo.sip.com/user taro.html | 05012341111 | taro | ON | ON | taro@pcl.example.com |
| http://www.tokyo.sip.com/user hanako.html | 05012342222 | hanako | OFF | OFF | hanako@pcl.example.com |

Fig.10

INVITE sip:taro@tokyo.sip.jp SIP/2.0
Via:SIP/2.0/UDP Tokyo.sip.jp:5060;branch=z9hG4bk776as3
From:jiro@tokyo.sip.jp;tag=r18f061962
To:taro@tokyo.sip.jp

Fig.13

| Telephone number | URI | User name | Recording | E-mail forwarding | Forwarding e-mail address |
|---|---|---|---|---|---|
| 05012341111 | taro@tokyo.sip.jp | taro | ON | ON | taro@pcl.example.com |
| 05012342222 | hanako@tokyo.sip.jp | hanako | OFF | OFF | hanako@pcl.example.com |

Fig.14

| Enum domain name | | Order | Preference | Flags | Service | | URI scheme | |
|---|---|---|---|---|---|---|---|---|
| | | | | | | | | URI |
| 1.1.1.1.4.3.2.1.0.5.1.8.e164.arpa | IN NAPTR | 100 | 10 | "u" | "E2U+sip" | "!^.*$!sip:" | taro@tokyo.sip.jp" | |
| 2.2.2.2.4.3.2.1.0.5.1.8.e164.arpa | IN NAPTR | 100 | 10 | "u" | "E2U+sip" | "!^.*$!sip:" | hanako@tokyo.sip.jp" | |

NAPTR resource record

IP TELEPHONE SYSTEM, IP TELEPHONE APPARATUS AND METHOD FOR RECORDING MESSAGE

BACKGROUND OF THE INVENTION

1. Field of the Invention

The present invention relates to an IP telephone system, an IP telephone apparatus and a method for recording a message.

2. Description of Related Art

The recent rapid growth of the Internet has drawn attention to an IP telephone system that enables low-cost voice communications with telephone apparatuses at remote places as well as free voice communications between IP telephone apparatuses owned by subscribers. Among such IP telephone systems, there is a proposal for an IP telephone system that allows the transmitting party to specify a screen display or ring tone on the receiving party's end for the purpose of improving user convenience (See Related Art 1, for example).

On the other hand, as an underlying technology, ENUM is emerging as the focus of attention, enabling communications according to individual user circumstances by effectively controlling information used for various communications tools including telephones, facsimiles, mobile phones and electronic mails. ENUM is designed to identify the Internet service with a unique global identification number such as the E. 164 number, using the DNS (Domain Name Server). Currently, the IETF (Internet Engineering Task Force) is seeking to standardize ENUM platforms, where protocol specifications are discussed (See Publication 1, for example).

| [Related Art 1] | Japanese Laid Open Publication 2003 - 188992 |
|---|---|
| [Publication 1] | Issued by ENUM Trial Japan "ENUM Trial Japan First Report" May, 2004 |

However, the above-described conventional IP telephone system only allows the transmitting party to specify, according to the caller's circumstances, operations performed on the receiving party's end, such operations relating to the screen display or the ring tone when a call is received. The conventional IP telephone system is not capable of specifying operations according to a call recipient's individual circumstances.

In general, IP telephone apparatuses used in homes or companies are shared by a plurality of users. For a shared IP telephone apparatus, when a user picks up a call intended for an absent user, it becomes necessary for the user to write down on a memo pad the caller's message and contact information for the absent user.

SUMMARY OF THE INVENTION

In such a telephone system, user convenience can be improved when, in the case where the intended recipient is absent, the caller's message can be recorded before the telephone is picked up so that writing down the caller's message on a memo pad can be avoided. The present invention is provided to address the above-described problems. The purpose of the present invention is to provide an IP telephone system, an IP telephone apparatus and a method for recording a message so that, in the case where the intended recipient is absent, caller's message can be recorded before the telephone is picked up.

The IP telephone system according to the present invention includes an IP telephone apparatus, a Web server and an ENUM server. The IP telephone apparatus is connected to an IP network. The Web server stores control information for controlling an answering machine function. The control information corresponds to a telephone number that is assigned to the IP telephone apparatus. The ENUM server stores a NAPTR resource record in which a URI specifies link information for the control information stored in the Web server. In the IP telephone system, an IP telephone apparatus that has received a call transmits, to the ENUM server, a query for a NAPTR resource record corresponding to an intended recipient's telephone number. The IP telephone apparatus then transmits, to the Web server, a request for the control information corresponding to the URI included in the obtained NAPTR resource record, and controls the answering machine function according to the obtained control information.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 illustrates an example of a table stored in the FROM of the IP telephone apparatus according to the first embodiment;

FIG. 6 illustrates an example of a NAPTR record stored in a DB of the ENUM server according to the first embodiment;

FIG. 7 illustrates an example of data stored in a DB of a DNS server according to the first embodiment;

FIG. 8 illustrates an example of data stored in a DB of a Web server according to the first embodiment;

FIG. 10 illustrates an example of the message "INVITE" transmitted from the source IP telephone apparatus to the destination IP telephone apparatus in the IP telephone system according to the first embodiment;

FIG. 13 illustrates an example of data stored in an answering machine control information table of the IP telephone apparatus according to the second embodiment;

FIG. 14 illustrates an example of a NAPTR record stored in a DB of an ENUM server according to the second embodiment;

DETAILED DESCRIPTION OF PREFERRED EMBODIMENTS

The embodiments of the present invention are explained in the following in reference to the above-described drawings.

First Embodiment

Figure 1:
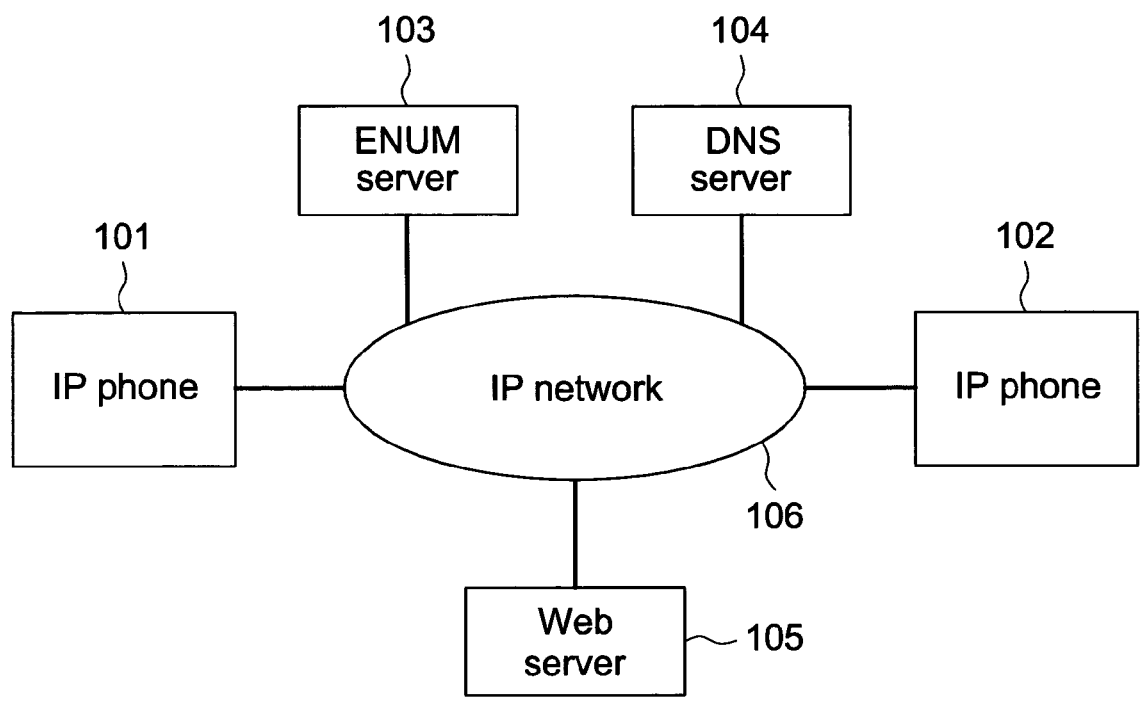
FIG. 1 illustrates a network configuration to which an IP telephone system according to the first embodiment of the present invention is applied.

FIG. 1 illustrates a network configuration to which the IP telephone system according to the first embodiment of the present invention is applied.

As shown in FIG. 1, a plurality of IP telephone apparatuses (hereafter referred to as "IP phone") 101 and 102, ENUM server 103, DNS server 104 and Web server 105 are mutually connected via IP network 106 in the IP telephone system according to the embodiment. Also, the IP telephone system is not limited to this embodiment and may be configured to connect three or more IP phones in IP network 106.

IP phone 101 (102) has a function enabling voice communication with another IP phone via IP network 106. IP phone 101 (102) also has a function allowing users to access Web server 105 according to the http protocol and read HTML texts provided by Web server 105.

Particularly, IP phone 102 is shared by a plurality of users. IP phone 102 also has telephone numbers assigned to each user. The following describes a case where IP phone 102 is shared by two users.

ENUM server 103 is equipped with a database (DB) that stores a NAPTR resource record (hereafter referred to as "NAPTR record"), which is described later. ENUM server 103 transmits, to IP phone 101 (102), a NAPTR record stored in the DB in response to a query from IP phone 101 (102).

DNS server 104 is equipped with a DB that stores a URI specified in a NAPTR record and an IP addresses corresponding to the URI. DNS server 104 transmits, to IP phone 101 (102), an IP address stored in the DB in response to a query from IP phone 101 (102).

Web server 105 is equipped with a DB that stores information for controlling an answering machine function. The information is specified in correspondence with each telephone number assigned to IP phone 101 (102) (hereafter referred to as "answering machine control information"). The answering machine control information includes information about the ON/OFF of a recording function in the answering machine function (hereafter referred to as "recording function"), information about the ON/OFF of a function for forwarding, via e-mail, a message recorded by using the recording function (hereafter referred to as "e-mail forwarding function"), and a forwarding e-mail address used for the e-mail forwarding function (hereafter referred to as "forwarding e-mail address"). Details about the answering machine control information will be explained later.

The answering machine control information stored in the DB of Web server 105 is, for example, registered by the IP phone 101 (102) user via IP network 106. More specifically, the answering machine control information is renewed according to the absence or presence situation of the IP phone 101 (102) user. The answering machine control information can also be registered by an IP telephone service administrator at the user's request. Web server 105 transmits, to IP phone 101 (102), the answering machine control information stored in the DB in response to a request from IP phone 101 (102) that has received a call.

Figure 2:
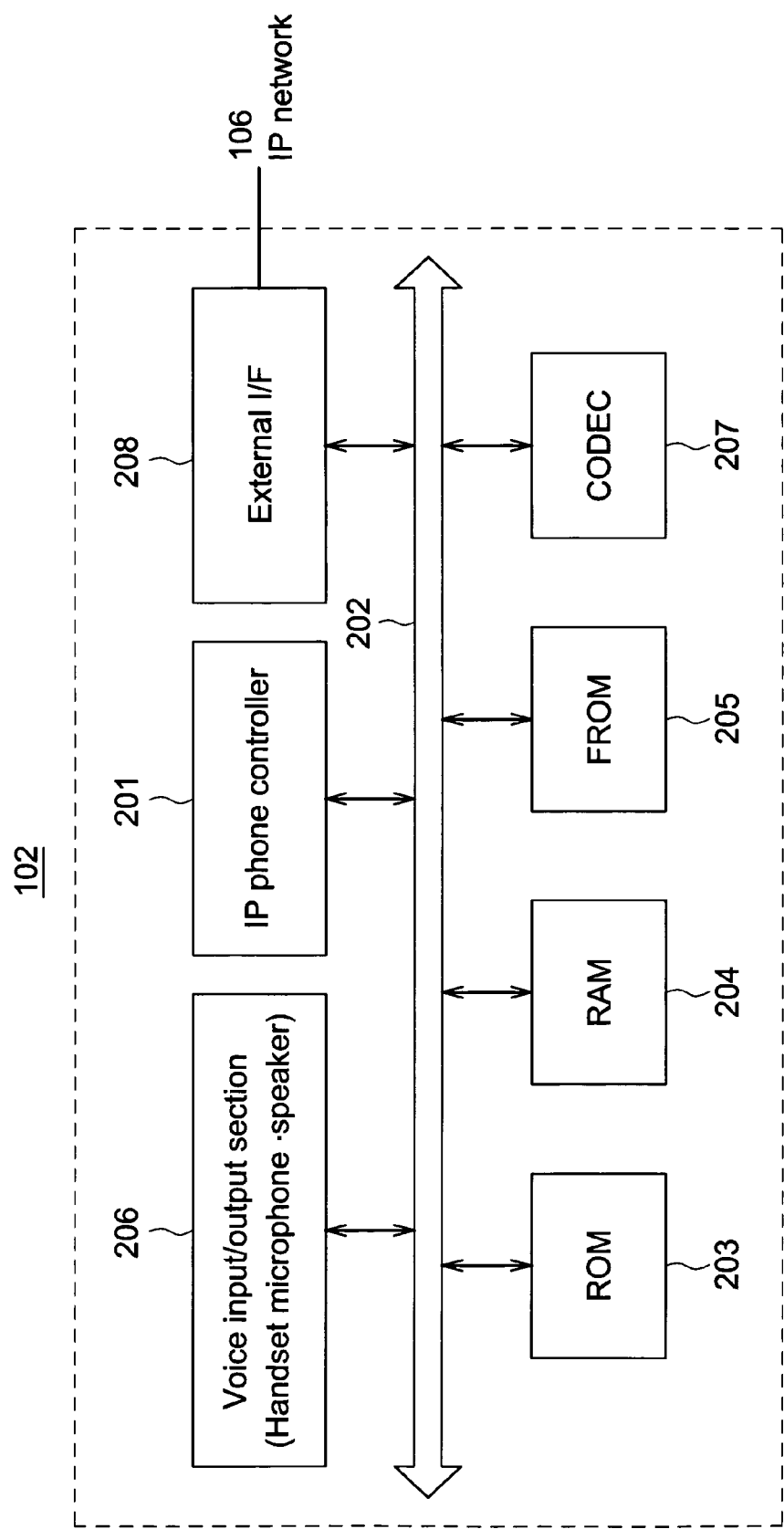
FIG. 2 illustrates a block diagram describing a configuration of an IP telephone apparatus that constitutes the IP telephone system according to the first embodiment.

FIG. 2 illustrates a block diagram describing a configuration of IP phone 102 according to the embodiment of the present invention. IP phone 101 has the same configuration as IP phone 102.

IP phone 102 shown in FIG. 2 includes IP phone controller 201 that controls the entire operation of the apparatus. ROM 203, RAM 204 and FROM 205 are connected to IP phone controller 201 via bus 202. Also, voice input/output section 206, CODEC 207 and external interface (I/F) 208 are connected to IP phone controller 201 via bus 202.

IP phone controller 201 executes the following control operation using a control program stored in ROM 203. During this execution, IP phone controller 201 utilizes RAM 204 as a work area.

IP phone controller-201 controls all operations needed to perform voice communication via IP network 106. For example, IP phone controller 201 executes a call control operation with the destination terminal according to call control protocols such as SIP or H.323.

IP phone controller 201 controls the transmission, to ENUM server 103, of a query for a NAPTR record corresponding to the destination terminal and the reception of a response to the query. IP phone controller 201 also controls the transmission, to DNS server 104, of a query for an IP address and the reception of a response to the query.

Furthermore, IP phone controller 201 controls access to Web server 105 and a reading of HTML texts provided by Web server 105.

Furthermore, IP phone controller 201 controls operations needed to perform the answering machine function and the e-mail forwarding function. For example, IP phone controller 201 controls the recording of the caller's message and the forwarding of the recorded message as a voice mail to a forwarding e-mail address. The recorded message is temporarily stored in FROM 205.

FROM 205 stores address book data used to specify a destination when a call is made from the apparatus. As mentioned above, FROM 205 also temporarily stores the message recorded by using the recording function. Furthermore, FROM 205 stores a table that registers telephone numbers and their corresponding URIs when a plurality of telephone numbers are assigned.

FIG. 3 shows an example of a table stored in FROM 205. FIG. 3 shows a case where two telephone numbers are assigned to IP phone 102. In the FIG. 3 table, FROM 205 stores URI "taro@tokyo.sip.jp" corresponding to telephone number "05012341111". Similarly, FROM 205 stores URI "hanako@tokyo.sip.jp" corresponding to telephone number "05012342222".

Voice input/output section 206 receives a user's voice from IP phone 102 and outputs voice to the user. Voice input/output section 206 is configured with a handset microphone as the voice input section and with a speaker as the voice output section.

CODEC 207 converts analog data input from voice input/output section 206 into digital data. CODEC 207 also converts digital data input from IP network 106 into analog data. CODEC 207 encodes the voice data and executes a compress/decompress operation to the voice data.

External I/F 208 functions as an interface to IP network 106 to which IP phone 102 is connected.

Figure 4:
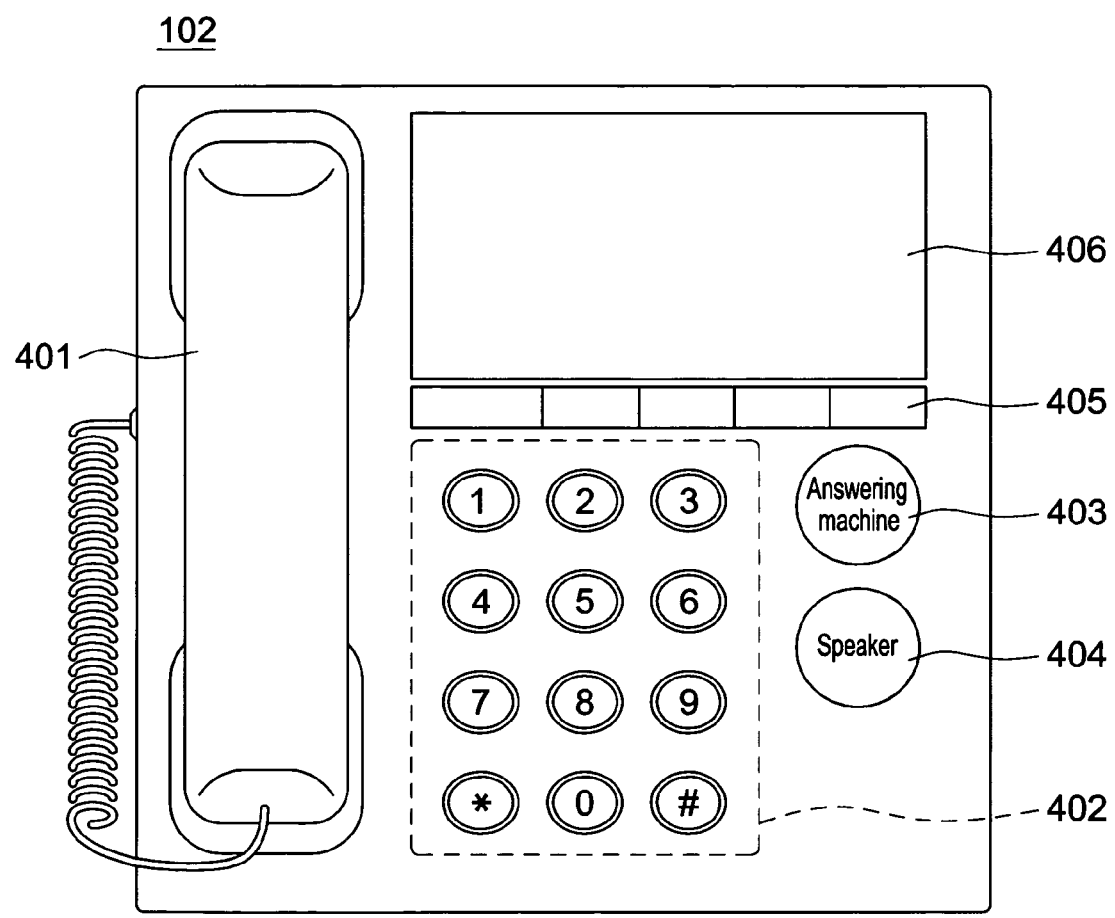
FIG. 4 illustrates the external front view of the IP telephone apparatus according to the first embodiment.

FIG. 4 shows the external front view of IP phone 102 according to the embodiment of the present invention. IP phone 101 has the same configuration as IP phone 102.

As shown in FIG. 4, IP phone 102 is equipped with receiver 401 that receives the user's voice. IP phone 102 is also equipped with numerical keys 402 through which telephone numbers and the like are input. To the right side of numerical keys 402 are AM (Answering Machine) button 403 and speaker button 404. AM button 403 is used to switch to the answering machine mode. Speaker button 404 is used to switch the voice output mode to external.

Function button 405 is located above numerical keys 402 and is able to set various functions such as a single touch function which enables a single touch transmission. Display 406 is located above function button 405. Display 406 is configured with an LCD or the like. Display 406 displays, for example, the current status of the apparatus or information regarding the call destination.

Figure 5:
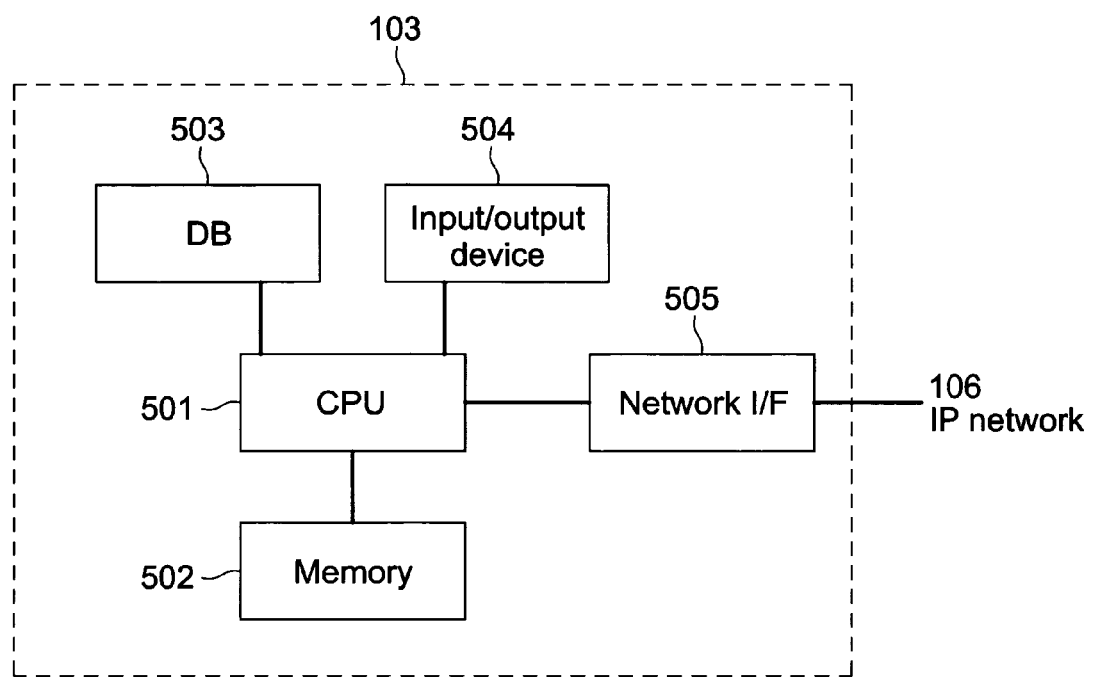
FIG. 5 illustrates a block diagram describing a typical configuration of an ENUM server according to the first embodiment.

FIG. 5 illustrates a block diagram describing a typical configuration of ENUM server 103 in the IP telephone system according to the embodiment of the present invention. DNS server 104 and Web server 105 in the IP telephone system according to the present embodiment have the same configuration except they have different data in their DBs.

As shown in FIG. 5, ENUM server 103 includes CPU 501 that controls the entire operation of the server. Memory 502 is connected to CPU 501. Memory 502 has ROM and RAM functions. The ROM stores the ENUM server 103 control program which CPU 501 retrieves and executes. The RAM functions as a work memory when CPU 501 executes the control program.

Database (DB) 503 is connected to CPU 501. DB 503 stores a NAPTR record, which is described later. When receiving a query for a NAPTR record from IP phone 101, for example, CPU 501 searches for a corresponding NAPTR record among the data stored in DB 503, and transmits the NAPTR record to IP phone 101.

Furthermore, input/output device 504 is connected to CPU 501. Input/output device 504 is configured with an input device such as a keyboard and an output device such as a display. The input device is used to add and edit the data stored in DB 503. The output device is used, for example, by an administrator of ENUM server 103 to confirm the data stored in DB 503.

Network interface (I/F) 505 is connected to CPU 501. Network I/F 505 is an interface to IP network 106 to which ENUM server 103 is connected.

FIG. 6 shows an example of a NAPTR record stored in DB 503 of ENUM server 103 according to the present embodiment. FIG. 6 shows an example where DB 503 stores NAPTR records corresponding to domain names obtained from telephone numbers "05012341111" and "05012342222".

In FIG. 6, URIs "taro@tokyo.sip.jp" and "//www.tokyo.sip.com/usertaro.html" correspond to domain name "1.1.1.1.4.3.2.1.0.5.1.8.e164.arpa" obtained from telephone number "05012341111". The service field of the first URI specifies "E2U+sip", which indicates that the terminal specified by "05012341111" is able to perform under the SIP protocol. The service field of the second URI specifies "E2U+http", which indicates that the terminal specified by "05012341111" is able to perform under the http protocol.

URIs "hanako@tokyo.sip.jp" and "//www.tokyo.sip.com/userhanako.html" correspond to domain name "2.2.2.2.4.3.2.1.0.5.1.8.e164.arpa" obtained from telephone number "05012342222". The service field of the first URI specifies "E2U+sip", which indicates that the terminal specified by "05012342222" is able to perform under the SIP protocol. The service field of the second URI specifies "E2U+http", which indicates that the terminal specified by "05012342222" is able to perform under the http protocol.

FIG. 7 illustrates an example of data stored in a DB of DNS server 104 according to the embodiment of the present invention.

FIG. 7 shows a case where the DB of DNS server 104 stores IP addresses corresponding to URIs "taro@tokyo.sip.jp", "hanako@tokyo.sip.jp", "jiro@tokyo.sip.jp" and "yoshiko@tokyo.sip.jp". More specifically, IP addresses "192.168.1.1", "192.168.1.2", "192.168.1.3" and "192.168.1.4" correspond to URIs "taro@tokyo.sip.jp", "hanako@tokyo.sip.jp", "jiro@tokyo.sip.jp" and "yoshiko@tokyo.sip.jp" respectively.

FIG. 8 illustrates an example of data stored in a DB of Web server 105 according to the present embodiment. In an actual use, the data shown in FIG. 8 is described, for example, in HTML (Hypertext Markup Language).

FIG. 8 shows a case where the DB of Web server 105 stores telephone numbers, user names, information about the ON/OFF of the recording function, information about the ON/OFF of the e-mail forwarding function and forwarding e-mail addresses corresponding to URLs (URIs) "//www.tokyo.sip.com/usertaro.html" and "//www.tokyo.sip.com/userhanako.html". More specifically, the DB stores telephone number "05012341111", user name "taro", recording function "ON", e-mail forwarding function "ON" and forwarding e-mail address "taro@pcl.example.com" corresponding to URL (URI) "//www.tokyo.sip.com/usertaro.html". Similarly, the DB stores telephone number "05012342222", user name "hanako", recording function "OFF", e-mail forwarding function "OFF" and forwarding e-mail address "hanako@pcl.example.com" corresponding to URL (URI) "//www.tokyo.sip.com/userhanako.html".

Figure 9:
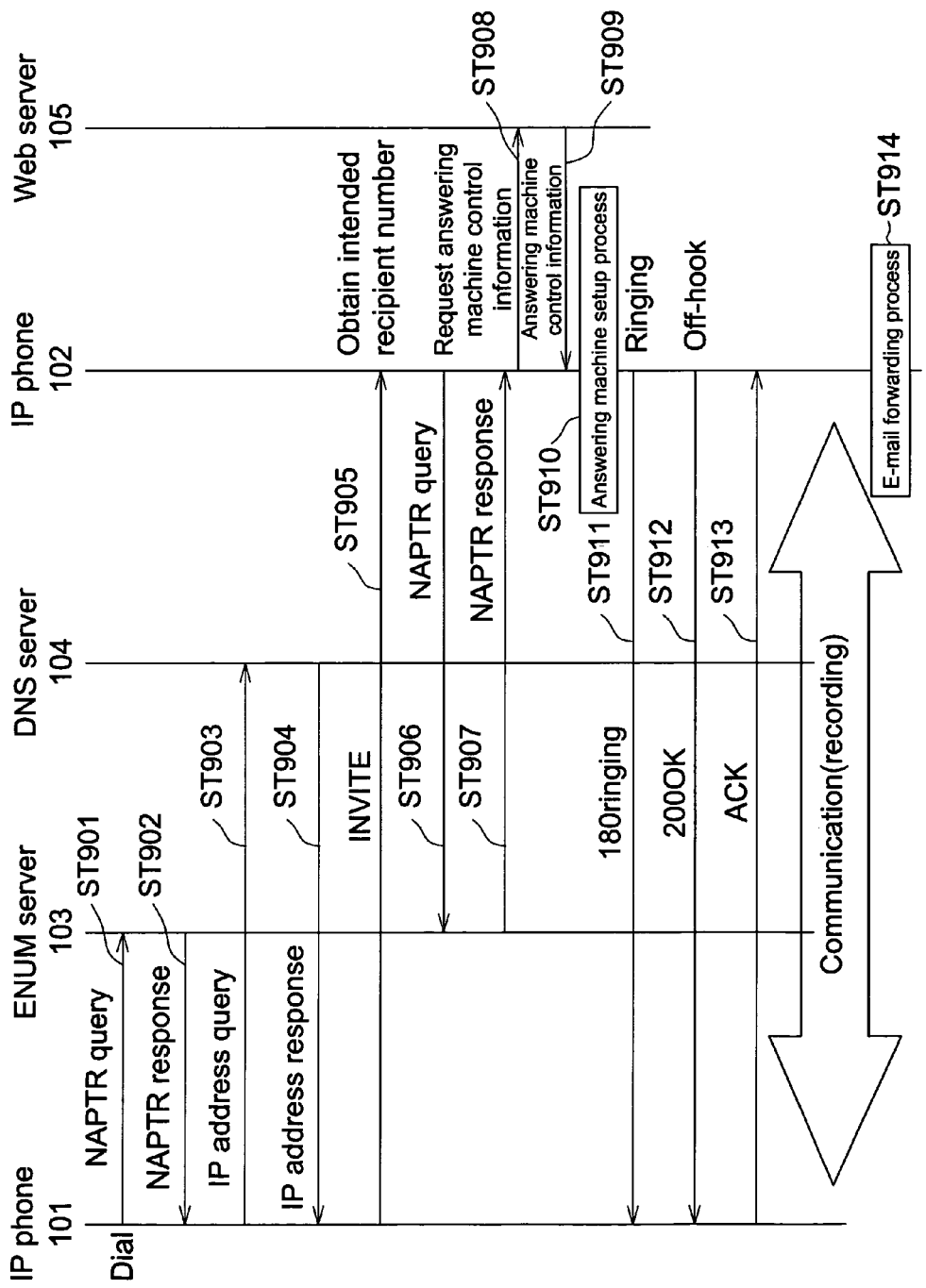
FIG. 9 illustrates a sequence diagram describing operations performed when a call is made from a source IP telephone apparatus to a destination IP telephone apparatus in the IP telephone system according to the first embodiment.

The following describes, with reference to the FIG. 9 sequence, operations performed when a call is made from IP phone 101 to IP phone 102 in the IP telephone system according to the present embodiment.

In this illustration, DB 503 of ENUM server 103 stores the NAPTR record shown in FIG. 6. The DB of DNS server 104 stores the data shown in FIG. 7. The DB of Web server 105 stores the data shown in FIG. 8. Telephone numbers "05012341111" and "05012342222" are assigned to IP phone 102.

When placing a call to IP phone 102, IP phone 101 receives, from the user, one of the telephone numbers assigned to IP phone 102. In this example, telephone number "05012341111" is input, the telephone number being among those for IP phone 102. Upon receiving the input telephone number, IP phone 101 transmits, to ENUM server 103, a query for a NAPTR record corresponding to the telephone number (ST 901). In the following, this query for NAPTR record is referred to as a "NAPTR query".

In this example, IP phone 101 first converts the operator's input number "05012341111" into "+81-5-012341111" including the country code according to standard E. 164. Then, "+815012341111" is obtained, maintaining+at the beginning and also maintaining the numbers. Then, non numerical symbols are deleted, and dots are inserted between the numbers, resulting in "8.1.5.0.1.2.3.4.1.1.1.1". Next, the numbers are reversed, and data string e164.arpa is added at the end. As a result, domain name "1.1.1.1.4.3.2.1.0.5.1.8.e164.arpa" is obtained. IP phone 101 then transmits the NAPTR query for the domain name.

Upon receiving the NAPTR query, ENUM server 103 searches for a NAPTR record corresponding to domain name "1.1.1.1.4.3.2.1.0.5.1.8.e164.arpa". ENUM server 103 then transmits, to IP phone 101, a response including the NAPTR record (ST 902). In the following, this response including a NAPTR record is referred to as a "NAPTR response". In this example, ENUM server 103 retrieves the upper NAPTR record, among the NAPTR records shown in FIG. 6 and transmits, to IP phone 101, a response including the NAPTR record.

Upon receiving the NAPTR response, IP phone 101 transmits, to DNS server 104, a query for the IP address corresponding to URI "taro@tokyo.sip.jp". The URI specified in the NAPTR record indicates that the destination terminal is able to perform under the SIP protocol (ST 903). In the following, this query for an IP address is referred to as an "IP address query".

Upon receiving the IP address query, DNS server 104 searches for the IP address corresponding to the URI and transmits, to IP phone 101, an IP address response including the IP address (ST 904). In this example, DNS server 104 retrieves the first IP address "192.168.1.1" shown in FIG. 7 and transmits, to IP phone 101, a response including the IP address. In the following, a response including an IP address is referred to as an "IP address response".

Upon receiving the IP address response, IP phone 101 confirms the IP address assigned to one of the IP phone 102 telephone numbers, the IP telephone number being specified by the user. IP phone 101 then transmits the message "INVITE" to the IP address destination (ST 905).

The following describes an example of the message "INVITE" transmitted from IP phone 101 to IP phone 102.

FIG. 10 shows an example of the message "INVITE" transmitted from IP phone 101 to IP phone 102.

As shown in FIG. 10, the message "INVITE" contains header "From" in the third line and header "To" in the forth line. Header "From" specifies URI "jiro@tokyo.sip.jp" corresponding to the telephone number of the source IP phone 101. Header "To" specifies URI "taro@tokyo.sip.jp" corresponding to the telephone number of the destination IP phone 102. The data in header "From" and header "To" is not limited to the one shown in FIG. 10.

Upon receiving the message "INVITE" from IP phone 101, IP phone 102 obtains, based on the URI specified in header "To", a telephone number specified as the recipient telephone number (hereafter referred to as an "intended recipient number"). More specifically, IP phone 102 obtains an intended recipient number by searching for one of the telephone numbers in the table stored in FROM 205, according to the URI specified in header "To". In this example, IP phone 102 obtains, as the intended recipient number, telephone number "05012341111" corresponding to URI "taro@tokyo.sip.jp", which is specified in header "To".

IP phone 102 then transmits, to ENUM server 103, a NAPTR query for the intended recipient number in the same manner as IP phone 101 after receiving the input telephone number (ST 906). More specifically, IP phone 102 first converts the operator's input number "05012341111" into "+81-5-012341111" including the country code according to standard E.164. Then, "+8151012341111" is obtained, maintaining+at the beginning and the numbers. Then, non numerical symbols are deleted, and dots are inserted between the numbers, resulting in "8.1.5.0.1.2.3.4.1.1.1.1". Next, the numbers are reversed, and data string e164.arpa is added at the end. As a result, domain name "1.1.1.1.4.3.2.1.0.5.1.8.e164.arpa" is obtained. IP phone 102 then transmits, to ENUM server 103, the NAPTR query for the domain name.

Upon receiving the NAPTR query, ENUM server 103 searches for a NAPTR record corresponding to domain name "1.1.1.1.4.3.2.1.0.5.1.8.e164.arpa" and transmits, to IP phone 102, a response including the NAPTR record (ST 907). In this example, ENUM server 103 retrieves the upper NAPTR record among the NAPTR records shown in FIG. 6 in the same process as ST 902 and transmits, to IP phone 102, a NAPTR response including the NAPTR record.

Upon receiving the NAPTR response, IP phone 102 requests answering machine control information by accessing Web server 105, based on URI "//www.tokyo.sip.com/usertaro.html" (ST 908). The URI specified in the NAPTR record indicates that the destination terminal is able to perform under the http protocol.

Upon receiving a request for the answering machine control information, Web server 105 searches for the answering machine control information corresponding to the request, and transmits the answering machine control information to IP phone 102 (ST 909). In this example, among the data shown in FIG. 8, Web server 105 transmits recording function "ON", e-mail forwarding function "ON" and forwarding e-mail address "taro@pcl.example.com" as the answering machine control information.

Upon obtaining the answering machine control information, IP phone 102 performs a process to set up the obtained answering machine control information on IP phone 102 itself (hereafter referred to as an "answering machine setup process") (ST 910). Here, because we have recording function "ON", e-mail forwarding function "ON" and forwarding e-mail address "taro@pcl.example.com", it is set up to record the caller's message and forward the recorded message to "taro@pcl.example.com".

After the answering machine setup process is performed, IP phone 102 sounds a ring tone. At the same time, IP phone 102 transmits the message "180 Ringing" to IP phone 101 (ST 911).

When an off-hook condition is detected at IP phone 102 during the transmission of the message "180 Ringing", IP phone 102 transmits, to IP phone 101, the "200 OK" message indicating a connection approval (ST 912). In the case where the recording function is set to the "ON" mode, IP phone 102 is setup to perform "off-hook" automatically. Therefore, even in the case where the intended recipient is absent, the process will proceed according to the sequence.

Upon receiving the "200 OK" message, IP phone 101 transmits the "ACK" message to IP phone 102 (ST 913). Once IP phone 102 receives the "ACK" message, voice communication becomes possible between IP phone 101 and IP phone 102.

In this example, because the recording function is set to the "ON" mode, voice output from IP phone 101 is stored in FROM 205 as a message. Because the e-mail forwarding function is also set to the "ON" mode, once the message is stored, an e-mail forwarding process is performed to forward this message to the specified forwarding e-mail address (ST 914). The operations involved when a call is made from IP phone 101 to IP phone 102 are performed as described above.

Figure 11:
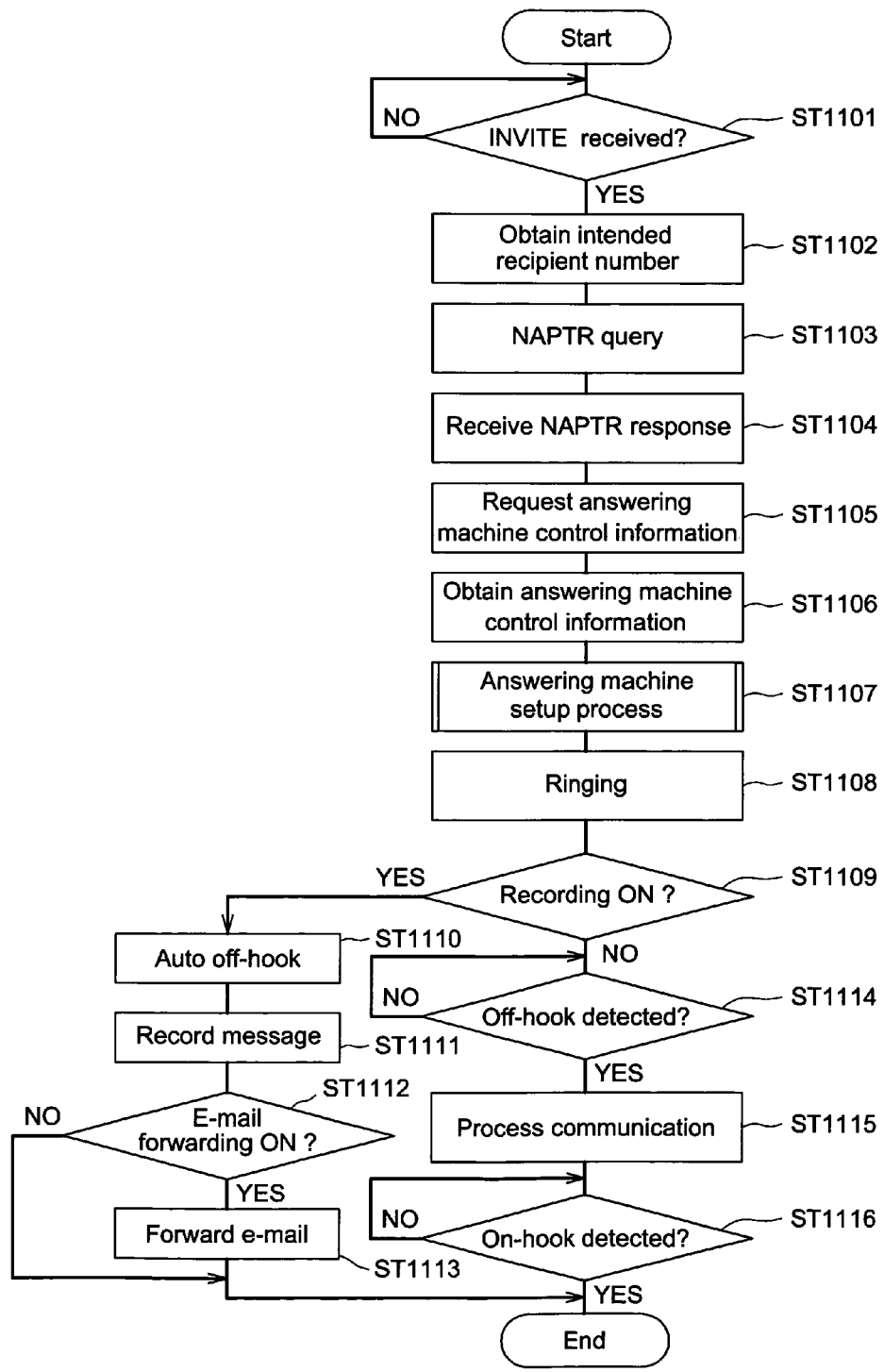
FIG. 11 illustrates a flow chart describing an operation of the destination IP telephone in the FIG. 9 sequence.

FIG. 11 illustrates a flow chart describing operations performed by the destination IP phone 102 in the FIG. 9 sequence.

IP phone 102 monitors, in a standby state, for the reception of the message "INVITE" via IP network 106 (ST 1101). When the message "INVITE" is received, IP phone 102 obtains, through the above-described operation, an intended recipient number based on header "To" of the message "INVITE" (ST 1102).

After obtaining the intended recipient number, IP phone 102 transmits, to ENUM server 103, a NAPTR query for the intended recipient number (ST 1103). In response to the query, ENUM server 103 transmits a NAPTR response, and IP phone 102 receives the NAPTR response (ST 1104).

Upon receiving the NAPTR response, IP phone 102 accesses Web server 105 based on the URI (URL) specified in the NAPTR record, among the NAPTR records included in the NAPTR response, the record indicating that the destination terminal is able to perform under the http protocol, and requests answering machine control information (ST 1105). In response to the request, Web server 105 transmits the answering machine control information, and IP phone 102 receives this answering machine control information. Thereby IP phone 102 obtains the answering machine control information (ST 1106).

After obtaining the answering machine control information, IP phone 102 performs the answering machine setup process (ST 1107). After the answering machine setup process is performed, IP phone 102 sounds a ring tone (ST 1108). At the same time as sounding the ring tone, IP phone 102 transmits the message "180 Ringing".

After transmitting the message "180 Ringing", IP phone 102 determines whether the recording function is set to the "ON" mode, the mode of the recording function being set in the answering machine setup process performed in ST 1107 (ST 1109). In this example, the recording function is set to the "ON" mode. In this case, IP phone 102 performs an "off-hook" automatically (ST 1110). Following the "off-hook" operation, IP phone 102 transmits, to the source IP phone 101, the message "200 OK" indicating connection approval. Communication becomes possible once IP phone 102 receives the message "ACK" transmitted from IP phone 101 in response to the message "200 OK". Then, in the current situation, the caller's message is recorded (ST 1111).

When the recording of the message is completed, IP phone 102 determines this time whether the e-mail forwarding function is set to the "ON" mode, the mode of the e-mail forwarding function being set in the answering machine setup process performed in ST 1107 (ST 1112). In the case where the e-mail forwarding function is set to the "ON" mode, IP phone 102 forwards the message to the forwarding e-mail address, which was specified in the answering machine setup process performed in ST 1107 (ST 1113), and terminates the process. On the other hand, in the case where the e-mail forwarding function is set to the "OFF" mode, IP phone 102 skips process ST 1113 and terminates the process.

In ST 1109, when the recording function is set to the "OFF" mode, IP phone 102 determines whether the off-hook condition is detected at the user side (ST 1114). ST 1114 is repeated until the off-hook condition is detected.

When the off-hook condition is detected, IP phone 102 transmits, to the source IP phone 101, the message "200 OK" indicating a connection approval. Upon receiving the message "ACK" transmitted from IP phone 101 in response to the message "200 OK", IP phone 102 performs a communication process (ST 1115).

In the communications process, IP phone 102 determines whether the on-hook condition is detected at the user side, while outputting voice data transmitted from IP phone 101 (ST 1116). When the on-hook condition is detected, IP phone 102 terminates the communications process. ST 1116 is repeated until the on-hook condition is detected. Operations involved when IP phone 102 receives a call from IP phone 101 are performed as described above.

As described above, in the IP telephone system according to the embodiment of the present invention, the destination IP phone 102 has been assigned a plurality of telephone numbers. The source IP phone 101 specifies a telephone number and initiates transmission. After receiving a NAPTR response corresponding to this telephone number, the source IP phone 101 transmits, to the destination IP phone 102, the message "INVITE". The destination IP phone 102 obtains the intended recipient number from the message "INVITE". Then, after receiving the NAPTR response corresponding to the intended recipient number, the destination IP phone 102 transmits, to Web server 105, a request for answering machine control information. Upon obtaining the answering machine control information, IP phone 102 performs the answering machine setup process and, according to the content of the answering machine control information, records the caller's message and forwards the recorded message. Accordingly, the destination IP phone 102 performs the recording of caller's message, etc., according to the telephone number specified by the source IP phone 101. Therefore, the caller's message is recorded before the IP phone 102 user picks up the telephone, and thus the process of writing down caller's message and contact information on a memo pad for the absent user can be avoided.

Particularly, in the IP telephone system according to the embodiment of the present invention, the answering machine control information includes the information about whether to record the caller's message (the recording function). Therefore, according to the content of the answering machine control information, it becomes possible to record the caller's message before the destination IP phone 102 user picks up the telephone. Similarly, the answering machine control information includes the information about whether to forward the recorded message to the pre-specified forwarding e-mail address (the e-mail forwarding function). Therefore, according to the content of the answering machine control information, it becomes possible to forward the caller's message before the destination IP phone 102 user picks up the telephone.

In the IP telephone system according to the embodiment of the present invention, Web server 105 transmits the answering machine control information corresponding to the intended recipient number, according to the http protocol, in response to a request from the destination IP phone 102. Accordingly, the answering machine control information corresponding to the intended recipient number can be obtained by executing a communication control process according to the http protocol.

Furthermore, in the IP telephone system according to the embodiment of the present invention, the destination IP phone 102 obtains the intended recipient number based on the received message "INVITE". More specifically, IP phone 102 obtains, as the intended recipient number, the telephone number corresponding to the URI specified in the message "INVITE". Accordingly, IP phone 102 can obtain the intended recipient number in the call control process performed according to the SIP protocol.

In the embodiment of the present invention, the source IP phone transmits, to DNS server 104 provided on IP network 106, an IP address query and transmits the message "INVITE" to the obtained IP address. However, the embodiment is not limited to this example. A CA (Call Agent) that functions as a SIP server may be provided on IP network 106 so that the message "INVITE" can be transmitted by specifying the telephone number of the destination terminal.

In the embodiment of the present invention, a case is explained wherein URIs are specified in header "From" and header "To" of the message "INVITE". However, the embodiment is not limited to this example. Telephone numbers can be used instead of URIs. In this case, it is possible to skip the process of obtaining an intended recipient number with reference to the table in FROM 205 by extracting a telephone number as the intended recipient number.

In the embodiment of the present invention, a case is explained wherein the destination IP phone 102 obtains, from Web server 105, the answering machine control information according to the http protocol. However, the method for obtaining the answering machine control information is not limited to obtaining, from Web server 105, the answering machine control information according to the http protocol. For example, the answering machine control information can be obtained from a DB server provided separately, using LDAP (Lightweight Directory Access Protocol) or FTP (File transfer Protocol). In this case, the same results as in the embodiment of the present invention can also be achieved.

In the embodiment of the present invention, the recording function and the e-mail forwarding function are controlled according to the answering machine control information. The answering machine control information is specified according to the setting of the destination IP phone 102. However, the method for controlling the recording function and the e-mail forwarding function is not limited to this example. It is also possible to control the functions by taking into consideration the information about the source IP phone 101. For example, it is possible to control the functions as follows. When a call is from a specific caller, forward the message by using the e-mail forwarding function; when a call is from other callers, record a message by using only the recording function.

Second Embodiment

The above describes a case where the destination IP phone 102 obtains the answering machine control information from Web server 105. However, the same results as the first embodiment can be achieved by pre-registering the answering machine control information corresponding to each telephone number that is assigned to the destination IP phone 102. The following describes the embodiment of the present invention in which such a configuration is applied to the destination IP phone.

Figure 12:
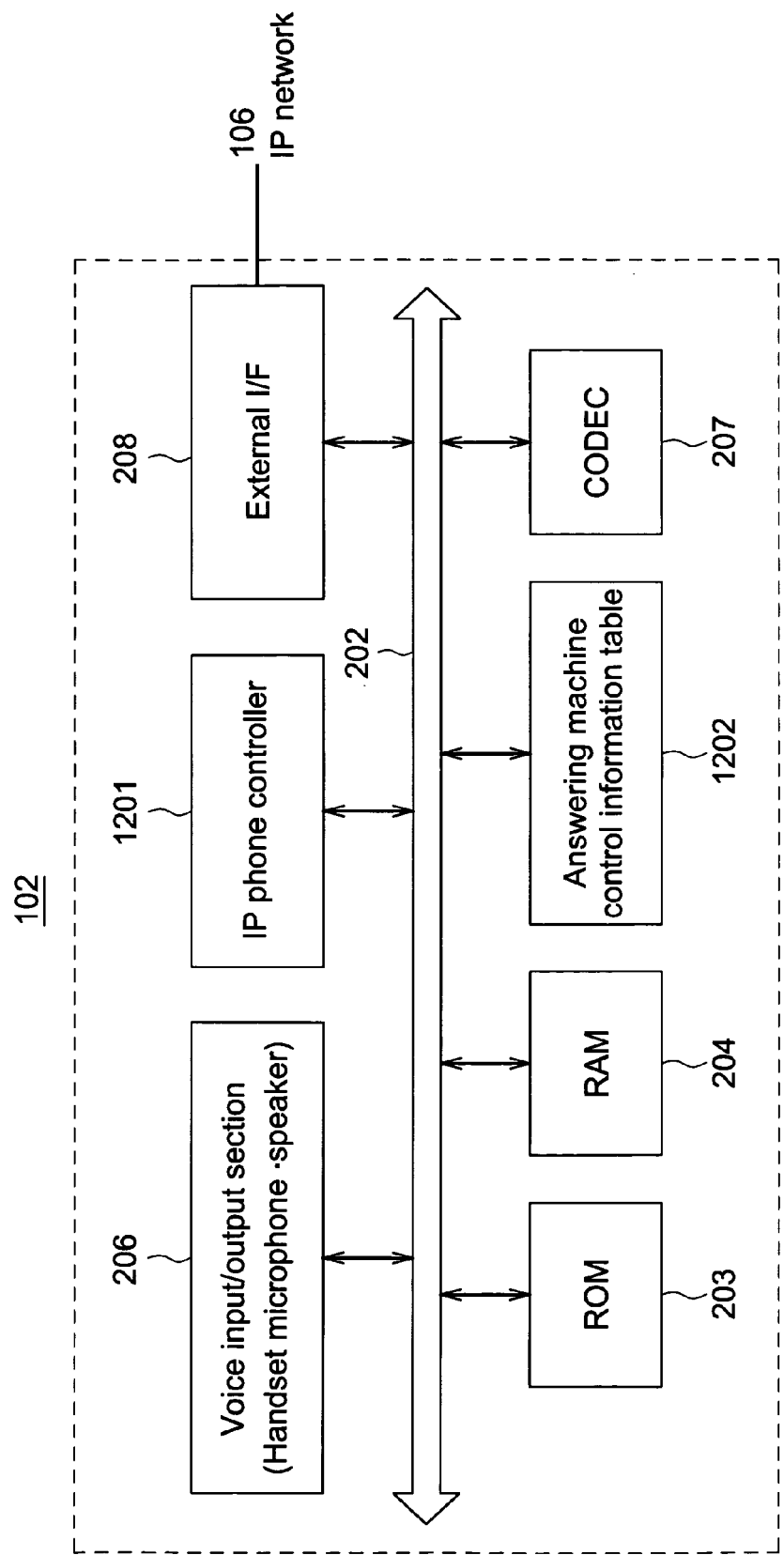
FIG. 12 illustrates a block diagram describing a configuration of an IP telephone apparatus in the IP telephone system according to the second embodiment.

FIG. 12 illustrates a block diagram describing a configuration of IP phone 102 according to the second embodiment of the present invention.

IP phone 102 shown in FIG. 12 differs from IP phone 102 in FIG. 2 in that IP phone 102 in FIG. 12 has a table, instead of FROM 205, the table storing answering machine control information corresponding to each telephone number that is assigned to IP phone 102 (hereafter referred to as a "answering machine control information table"). The address book data stored in FROM 205 and the message recorded by using the recording function are stored in the answering machine control information table. Another difference is that the IP phone controller of IP phone 102 in FIG. 12 has no function which controls operations related to Web server 105, but has a function which controls the answering machine function according to the answering machine control information stored in the answering machine control information table. In FIG. 12, components identified with the same numbers as those in FIG. 2 have the same functions, and their descriptions have been omitted.

IP phone controller 1201 has the same functions as IP phone controller 201 shown in FIG. 2 except that IP phone controller 1201 has no function which controls access to Web server 105 and reads HTML texts provided by Web server 105.

IP phone controller 1201 has a function which determines a telephone number corresponding to a URI specified by the source IP phone 101 via IP network 106, and controls the answering machine function according to the telephone number. More specifically, IP phone controller 1201 retrieves a telephone number stored in answering machine control information table 1202 according to a URI specified by the source IP phone 101, and controls the answering machine function according to the answering machine control information that corresponds to the telephone number.

FIG. 13 shows an example of data stored in answering machine control information table 1202. FIG. 13 shows a case where two telephone numbers are assigned to IP phone 102.

Answering machine control information table 1202 stores a URI, a user name, information about ON/OFF of the recording function, information about ON/OFF of the e-mail forwarding function and a forwarding e-mail address corresponding to each telephone number that is assigned to IP phone 102. In FIG. 13, URI "taro@tokyo.sip.jp," user name "taro", recording function "ON", e-mail forwarding function "ON" and forwarding e-mail address "taro@pcl.example.com" corresponding to telephone number "05012341111" are stored. Also, URI "hanako@tokyo.sip.jp," user name "hanako" recording function "OFF", e-mail forwarding function "OFF" and forwarding e-mail address "hanako@pcl.example.com" corresponding to telephone number "05012342222" are stored.

FIG. 14 shows an example of a NAPTR record stored in DB 503 of ENUM server 103 according to the second embodiment of the present invention. FIG. 14 shows a case where DB 503 stores NAPTR records corresponding to domain names obtained from telephone numbers "05012341111" and "05012342222".

In FIG. 14, URI "taro@tokyo.sip.jp" corresponds to domain name "1.1.1.1.4.3.2.1.0.5.1.8.e164.arpa" obtained from telephone number "05012341111". Also, URI "hanako@tokyo.sip.jp" corresponds to domain name "2.2.2.2.4.3.2.1.0.5.1.8.e164.arpa" obtained from telephone number "05012342222".

Figure 15:
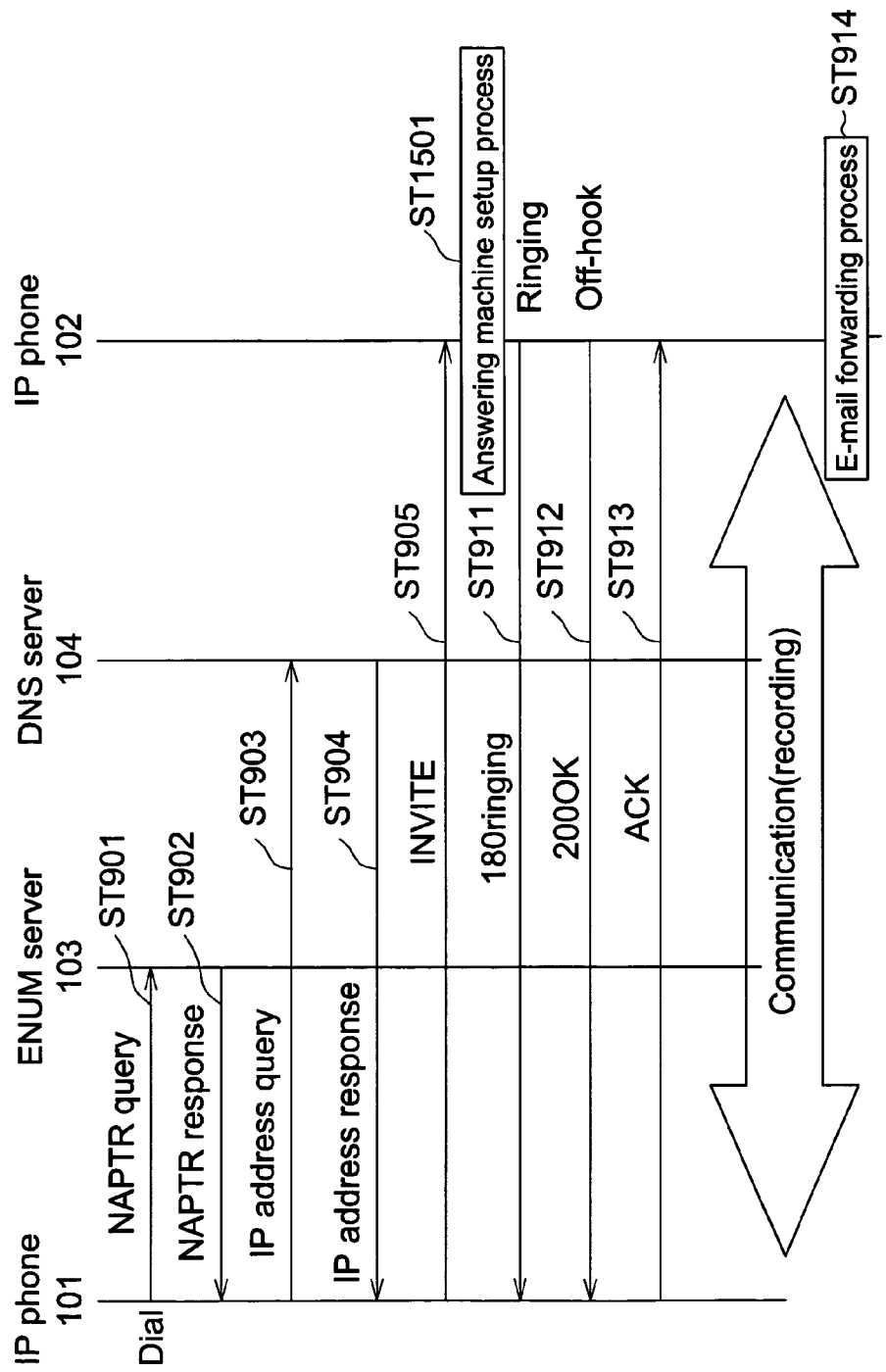
FIG. 15 illustrates a sequence diagram describing operations performed when a call is made from a source IP telephone apparatus to a destination IP telephone apparatus in the IP telephone system according to the second embodiment.

The following describes, with reference to the FIG. 15 sequence, the operations performed in the case where a call is made from IP phone 101 to IP phone 102 in the IP telephone system according to the second embodiment of the present invention. In FIG. 15, the same processes as those in FIG. 9 have the same identifying numbers, and their descriptions have been omitted.

In this illustration, DB 503 of ENUM server 103 stores the NAPTR record shown in FIG. 14, and the DB of DNS server 104 stores the data shown in FIG. 7. Telephone numbers "05012341111" and "05012342222" are assigned to IP phone 102.

The IP telephone system according to the second embodiment of the present invention differs from the IP telephone system according to the first embodiment in that, after receiving the message "INVITE", the destination IP phone 102 performs the answering machine setup process (ST 1501) without obtaining answering machine control information from Web server 105. Another difference is that, in the IP telephone system according to the second embodiment of the present invention, the destination IP phone 102 does not perform operations ST 906-ST 909 shown in FIG. 9.

More specifically, as shown in FIG. 15, upon receiving the message "INVITE" from IP phone 101 in ST 905, IP phone 102 confirms the URI specified in header "To" of the message "INVITE". In this example, the data shown in FIG. 10 is transmitted as the message "INVITE". Therefore, IP phone 102 confirms URI "taro@tokyo.sip.jp" specified in header "To". IP phone 102 then obtains, from answering machine control information table 1202, the answering machine control information corresponding to the confirmed URI, and performs the answering machine setup process.

Figure 16:
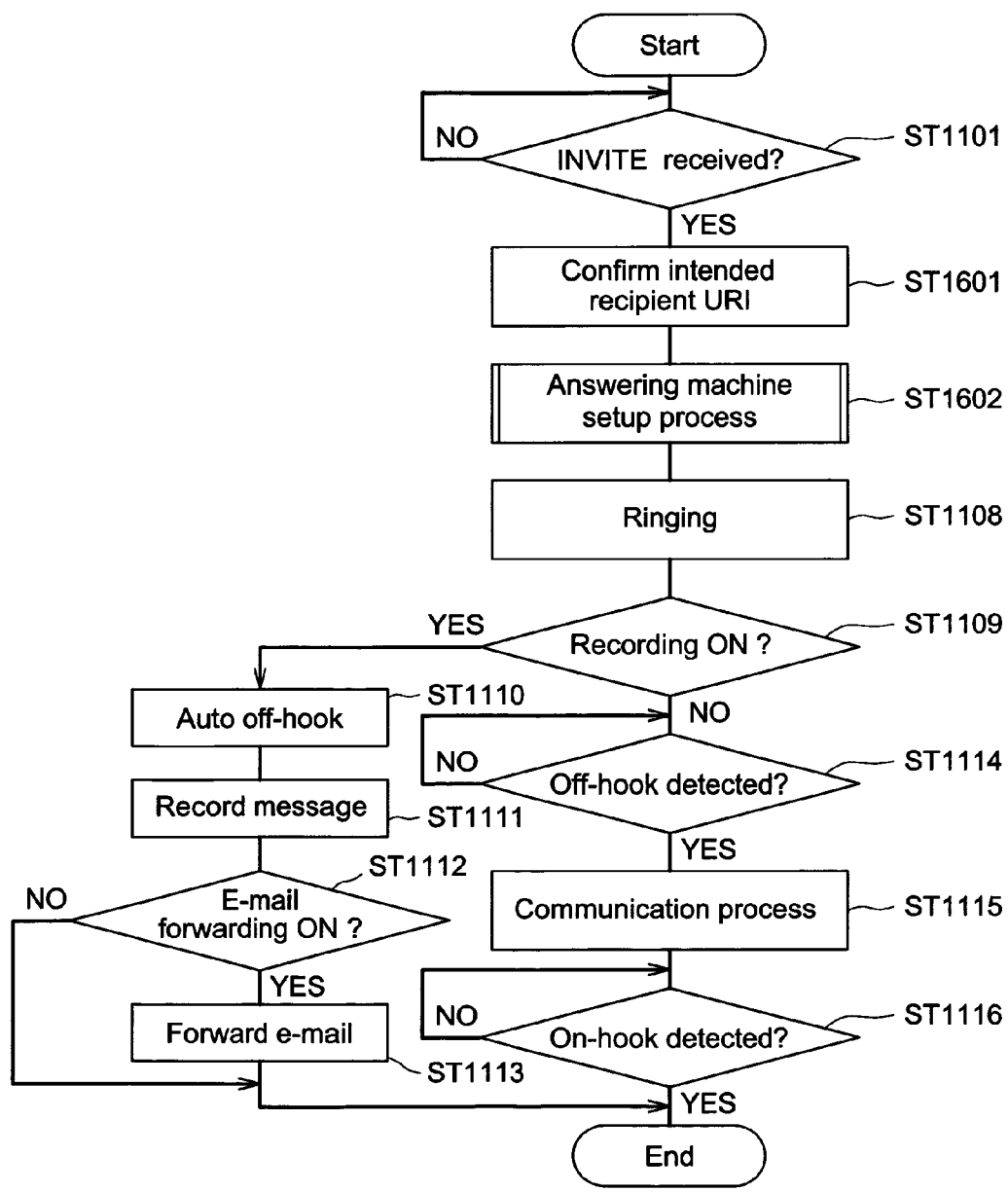
FIG. 16 illustrates a flow chart describing an operation of the destination IP telephone apparatus in the FIG. 15 sequence.

FIG. 16 illustrates a flow chart describing an operation of the destination IP phone 102 in the FIG. 15 sequence. FIG. 16 uses the same numbers as FIG. 11 for the same processes, and their descriptions have been omitted.

When receiving the message "INVITE" in ST 1101 in the IP telephone system according to the second embodiment of the present invention, the destination IP phone 102 confirms the URI specified as the intended recipient in the header "To" (hereafter referred to as an "intended recipient URI") (ST 1601). Then, IP phone 102 obtains the answering machine control information corresponding to the intended recipient URI from answering machine control information table 1202, and performs the answering machine setup process (ST 1602). IP phone 102 then terminates the process, as described in the first embodiment, after operations ST 1108-ST 1116 are performed.

As described above, in the IP telephone system according to the second embodiment of the present invention, the destination IP phone 102 has been assigned a plurality of telephone numbers. The source IP phone 101 specifies one of the telephone numbers and places a call. After receiving a NAPTR response corresponding to the telephone number, the source IP phone 101 transmits the message "INVITE" to the destination IP phone 102. The destination IP phone 102 confirms the intended recipient URI from the message "INVITE". After this, the destination IP phone 102 obtains, from answering machine control information table 1202, the answering machine control information corresponding to the intended recipient URI. Then, the destination IP phone 102 performs the answering machine setup process and, according to the content of the answering machine control information, records a caller's message and forwards the recorded message. Accordingly, the destination IP phone 102 performs the recording of the caller's message, etc., according to the telephone number specified by the source IP phone 101. Therefore, the caller's message is recorded before the IP phone 102 user picks up the telephone, and thus the process of writing down the caller's message and contact information on a memo pad for the absent user can be avoided.

In the flow chart illustrated in FIG. 16, the intended recipient URI described in the message "INVITE" is confirmed in ST 1601, and the answering machine control information corresponding to the intended recipient URI is obtained from answering machine control information table 1202, after which the answering machine setup process is performed in ST 1602. However, the control operation in performing the answering machine setup process based on the description in the INVITE message is not limited to this example. For example, the answering machine setup process may also be performed by confirming the user name specified before the "@" mark of the intended recipient URI, which is described in the message "INVITE", and obtaining the answering machine control information corresponding to this user name from answering machine control information table 1202, and performing the answering machine setup process. In such a modified case, the same results as in the first embodiment can also be achieved.

In the IP telephone system according to the present invention, the voice is not limited to the human voice. It may also include sounds in general, for example, modem signals modulated to voice bands and fax signals. Also, the telephone can be a fax apparatus as well.

Furthermore, in the IP telephone system according to the present embodiment, the IP telephone is described as a single device. However, it is not limited to this embodiment. In other words, the IP telephone can be configured by connecting an ordinary telephone apparatus to a control adapter that has a function which uses the connected ordinary telephone apparatus as an IP telephone. In this illustration, the ordinary telephone apparatus is a telephone apparatus that has no function to perform voice communication via IP network 106.

The IP telephone described above includes an IP telephone defined by the government and operated by a telecommunications provider. It also includes an IP telephone provided on a local network or a private network using TCP/IP or other computer network protocols.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-228585 filed on Aug. 4, 2004, entire content of which is expressly incorporated by reference herein.

What is claimed is:

1. An IP (Internet Protocol) telephone system, comprising:
a call-originating IP telephone apparatus that is connected to an IP network;
a call-receiving IP telephone apparatus, having a plurality of assigned telephone numbers, that is connected to the IP network;
a Web server that stores control information for controlling an answering function, the control information corresponding to the plurality of telephone numbers assigned to the call-receiving IP telephone apparatus, and transmits to the call-receiving IP telephone apparatus, the control information that corresponds to an intended recipient telephone number of the plurality of telephone numbers in response to a request from the call-receiving IP telephone apparatus; and
an ENUM (Telephone Number Mapping) server that stores NAPTR (Naming Authority Pointer) resource records in which URIs (Uniform Resource Identifiers) specify link information related to the control information, the control information being stored in the Web server, and transmits to the call-receiving IP telephone apparatus a NAPTR resource record in response to a query from the call-receiving IP telephone apparatus,
wherein when a call is received by the call-receiving IP telephone apparatus, the call-receiving IP telephone apparatus transmits to the ENUM server a query for a NAPTR resource record according to the intended recipient telephone number, transmits to the Web server a request for the control information corresponding to the URI included in an obtained NAPTR resource record, and controls the answering function according to obtained control information that corresponds to the intended recipient telephone number, and wherein controlling the answering function includes the call-receiving IP telephone apparatus controlling a recording of a message from the call-originating IP telephone apparatus according to the obtained control information from the web server.

2. The IP telephone system according to claim 1, wherein the obtained control information includes information about whether to record a caller's message.

3. The IP telephone system according to claim 2, wherein the obtained control information includes information about whether to forward a recorded message to a predetermined forwarding e-mail address, by the call-receiving IP telephone apparatus.

4. The IP telephone system according to claim 1, wherein an http protocol is specified in the NAPTR resource records stored in the ENUM server, and when a call is received by the call-receiving IP telephone apparatus, the call-receiving IP telephone apparatus transmits to the Web server a request for the control information according to the http protocol.

5. The IP telephone system according to claim 1, wherein, when a call is received by the call-receiving IP telephone apparatus, the call-receiving IP telephone apparatus obtains the intended recipient telephone number based on a description of a received INVITE message.

6. A call-receiving IP (Internet Protocol) telephone apparatus connected to a Web server and an ENUM (Telephone Number Mapping) server, the Web server storing control information for controlling an answering function, the control information corresponding to a plurality of telephone numbers assigned to the call-receiving IP telephone apparatus on an IP network, the ENUM server storing NAPTR (Naming Authority Pointer) resource records in which a URI (Uniform Resource Identifier) specifies link information related to the control information, the control information being stored in the Web server, the call-receiving IP telephone apparatus comprising:
   a querier that transmits to the ENUM server a query for a NAPTR resource record according to an intended recipient telephone number of the plurality of telephone numbers assigned to the call-receiving IP telephone apparatus, when a call is received from a call-originating IP telephone apparatus on the IP network;
   a requester that transmits, to the Web server, a request for the control information corresponding to the URI included in an obtained NAPTR resource record; and
   a controller that controls the answering function according to obtained control information, received from the web server, that corresponds to the intended recipient telephone number,
   wherein controlling the answering function includes the call-receiving IP telephone apparatus controlling a recording of a message from the call-originating IP telephone apparatus according to the obtained control information from the web server.

7. The call-receiving IP telephone apparatus according to claim 6, wherein the control information includes information about whether to record a caller's message.

8. The call-receiving IP telephone apparatus according to claim 7, wherein the obtained control information includes information about whether to forward a recorded message to a predetermined forwarding e-mail address, by the call-receiving IP telephone apparatus.

9. A method for recording a message using a call-receiving IP (Internet Protocol) telephone apparatus, the call-receiving IP telephone apparatus being connected to a Web server and an ENUM (Telephone Number Mapping) server, the Web server storing control information for controlling an answering function, the control information corresponding to a plurality of telephone numbers assigned to the call-receiving IP telephone apparatus on an IP network, the ENUM server storing NAPTR (Naming Authority Pointer) resource records in which a URI specifies link information related to the control information, the control information being stored in the Web server, the method comprising:
   transmitting, by the call-receiving IP telephone apparatus to the ENUM server, a query for a NAPTR resource record according to an intended recipient telephone number of the plurality of telephone numbers assigned to the call-receiving IP telephone apparatus, when a call is received by the call-receiving IP telephone apparatus from a call-originating IP telephone apparatus on the IP network;
   transmitting, by the call-receiving IP telephone apparatus to the Web server, a request for the control information corresponding to the URI included in an obtained NAPTR resource record; and
   controlling, by the call-receiving IP telephone apparatus, the answering function according to obtained control information that corresponds to the intended recipient telephone number,
   wherein controlling the answering function includes the call-receiving IP telephone apparatus controlling a recording of a message from the call-originating IP telephone apparatus according to the obtained control information from the web server.

10. The method for recording a message according to claim 9, wherein the obtained control information includes information about whether to record a caller's message.

11. The method for recording a message according to claim 10, wherein the obtained control information includes information about whether to forward a recorded message to a predetermined forwarding e-mail address, by the call-receiving IP telephone apparatus.

12. An IP (Internet Protocol) telephone system, comprising:
   a destination IP telephone apparatus that stores URIs (Uniform Resource Identifiers) and control information, corresponding to a plurality of telephone numbers assigned to the destination IP telephone apparatus, the control information being utilized for controlling an answering function,
   an ENUM (Telephone Number Mapping) server that stores NAPTR (Naming Authority Pointer) resource records in which the URIs are associated with the plurality of telephone numbers assigned to the destination IP telephone apparatus, and transmits to the destination IP telephone apparatus, a NAPTR resource record in response to a query from the destination IP telephone apparatus; and
   a source IP telephone apparatus that transmits, to the ENUM server, a query for a NAPTR resource record by specifying an intended recipient telephone number of the plurality of telephone numbers assigned to the destination IP telephone apparatus, and transmits to the destination IP telephone apparatus, a URI included in an obtained NAPTR resource record when placing a call to the destination IP telephone apparatus,
   wherein when a call is received by the destination IP telephone apparatus, the destination IP telephone apparatus controls the answering function according to the control information, stored in the destination IP telephone apparatus, that corresponds to the intended recipient telephone number, the control information corresponding to the URI transmitted from the source IP telephone apparatus, and wherein controlling the answering function includes the destination IP telephone apparatus controlling a recording of a message from the source IP telephone apparatus according to the control information stored in the destination IP telephone apparatus.

13. The IP telephone system according to claim 12, wherein the stored control information includes information about whether to record a caller's message.

14. The IP telephone system according to claim 13, wherein the stored control information includes information about whether to forward a recorded message to a predetermined forwarding e-mail address, by the destination IP telephone apparatus.

15. A method for recording a message using a source IP (Internet Protocol) telephone apparatus and a destination IP telephone apparatus, the source IP telephone apparatus and the destination IP telephone apparatus being connected to an ENUM (Telephone Number Mapping) server, the ENUM server storing NAPTR (Naming Authority Pointer) resource records in which URIs (Uniform Resource Identifier) are associated with a plurality of telephone numbers assigned to the destination IP telephone apparatus on an IP network, the destination IP telephone apparatus storing URIs and control information, corresponding to the plurality of telephone numbers assigned to the destination IP telephone apparatus, the control information being utilized for controlling an answering function, the method comprising:

transmitting, from the source IP telephone apparatus to the ENUM server, a query for a NAPTR resource record by specifying an intended recipient telephone number of the plurality of telephone numbers of the destination IP telephone apparatus;

transmitting, from the source IP telephone apparatus to the destination IP telephone apparatus, a URI included in an obtained NAPTR resource record when placing a call to the intended recipient telephone number of the plurality of telephone numbers of the destination IP telephone apparatus; and controlling, at the destination IP telephone apparatus, the answering function according to the control information stored in the destination IP telephone apparatus, that corresponds to the intended recipient telephone number, the control information corresponding to the URI transmitted from the source IP telephone apparatus, wherein controlling the answering function includes the destination IP telephone apparatus controlling a recording of a message from the source IP telephone apparatus according to the control information stored in the destination IP telephone apparatus.

16. The method for recording a message according to claim 15, wherein the control information, stored in the destination IP telephone apparatus, includes information about whether to record a caller's message.

17. The method for recording a message according to claim 16, wherein the control information, stored in the destination IP telephone apparatus, includes information about whether to forward a recorded message to a predetermined forwarding e-mail address, by the destination IP telephone apparatus.

* * * * *